United States Patent
Suzuki

Patent Number: 5,253,729
Date of Patent: Oct. 19, 1993

[54] POWER STEERING SYSTEM

[75] Inventor: Katsuhiro Suzuki, Kani, Japan

[73] Assignee: Kayaba Kogyo Kabushiki Kaisha, Minato, Japan

[21] Appl. No.: 795,016

[22] Filed: Nov. 20, 1991

Related U.S. Application Data

[63] Continuation of PCT/JP90/00633, May 18, 1990

[30] Foreign Application Priority Data

May 22, 1989 [JP] Japan .................... 1-128149

[51] Int. Cl.⁵ .................... B62D 5/083; B62D 6/02
[52] U.S. Cl. .................... 180/142; 180/141; 180/148; 91/375 A; 91/449; 137/625.23
[58] Field of Search .................... 180/132, 141, 142, 143, 180/149, 148; 137/625.21, 625.22, 625.23; 91/375 A, 375 R, 449

[56] References Cited

U.S. PATENT DOCUMENTS

| | | | |
|---|---|---|---|
| 4,862,985 | 9/1989 | Uchida et al. | 180/141 |
| 4,958,695 | 9/1990 | Uchida et al. | 180/142 |
| 5,048,630 | 9/1991 | Schaffer | 180/142 |
| 5,092,418 | 3/1992 | Suzuki | 180/149 |
| 5,107,752 | 4/1982 | Elser | 180/149 |

FOREIGN PATENT DOCUMENTS 0084501 7/1983 European Pat. Off. ............ 180/148

Primary Examiner—Margaret A. Focarino
Assistant Examiner—Anne Marie Boehler
Attorney, Agent, or Firm—Thomas R. Morrison

[57] ABSTRACT

A steering system rotary valve having relatively rotatable spool and sleeve members and including first and second valve groups for controlling the amount of fluid feed to a power cylinder responsive to spool/sleeve rotation and including third and fourth valve groups for controlling feed pressure of fluid discharged from a pump, is provided with blocks arranged between the first and second valve groups and between the third and fourth valve groups to interrupt communication between these groups and also is provided with a variable throttle valve on the downstream side of the third and fourth valve groups so that pressure acting on all the valve groups is substantially equalized to provide uniform pressure on the entire circumference of the spool and the sleeve thereby preventing these members from becoming pressure deformed during the course of rotary valve operation.

1 Claim, 9 Drawing Sheets

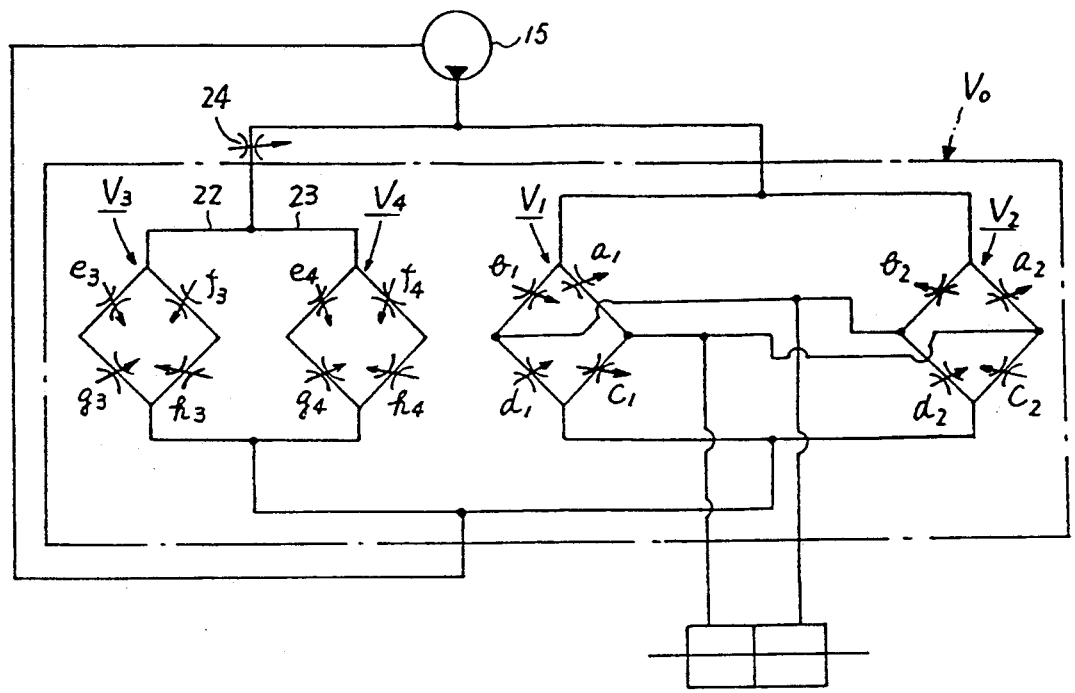
FIGURE 9-B
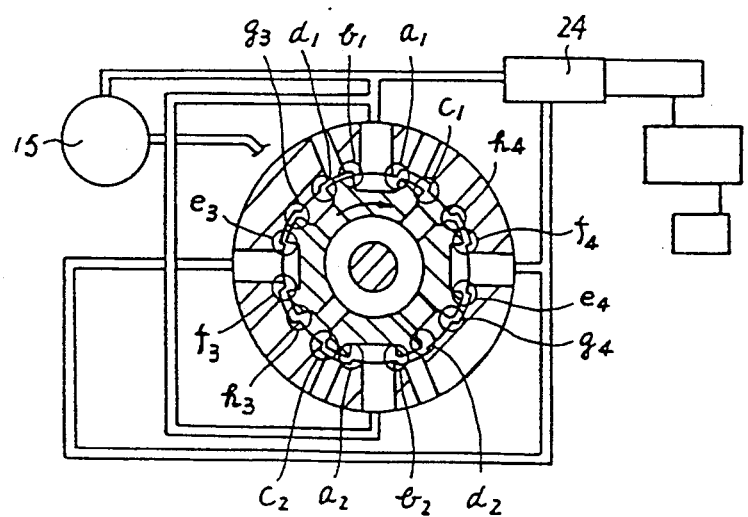
FIGURE 10

5,253,729

POWER STEERING SYSTEM

This is a continuation of International Application PCT/JP90/00633, filed May 18, 1990.

DESCRIPTION

1. Technical Field

This invention relates to a power steering system including a rotary valve.

2. Background Art

A conventional power steering system is disclosed in U.S. Pat. No. 4,570,736 and constructed in such a manner as shown in FIGS. 7 to 10. More particularly, the conventional power steering system includes a casing 1, into which an input shaft 2 is inserted. Also, in the casing 1 are arranged a rack 3 and a pinion shaft 5 formed thereon with a pinion 4 engaged with the rack 3. The input shaft 2 is connected through a torsion bar 6 to the pinion shaft 5.

In the so-constructed conventional system, during initial turning of a handle (not shown), the input shaft 2 is adapted to be rotated with the turning of the handle. At this time, rotation of the pinion 5 is restricted or regulated due to the action of grounding resistance. This causes a rotary spool 7 arranged integral with the input shaft 2 and a sleeve 8 fitted on the rotary spool 7 to be rotated relative to each other.

A construction of a control valve section Vc for power steering comprising the above-described rotary spool 7 and sleeve 8 is shown in FIG. 8.

More particularly, the control valve section Vc includes a plurality of return channels 9, first association channels 10 and 11, and second association channels 12 and 13 which are formed on an outer periphery of the rotary spool 7. The return channels 9 each are provided so as to communicate through a return passage 14 formed on the input shaft 2 with a suction side of a pump 15. The sleeve 8 is formed with feed ports 16 and 17, cylinder port channels 18, 19, 20 and 21 and bypass ports 22 and 23 in a manner to be radially extended through the sleeve 8. The feed ports 16 and 17 are adapted to constantly communicate with the pump 15. The cylinder port channels 18 and 21 communicate with one of pressure chambers of a power cylinder (not shown) and the cylinder port channels 19 and 20 communicate with the other pressure chamber of the power cylinder.

The respective channels cooperate with one another to constitute valve sections $a_1$ to $d_1$ and valve sections $e_3$ to $h_3$. Further, the conventional power steering system includes an additional set of valve sections formed in the same circumferential direction. FIG. 9A shows such a situation by means of an equivalent circuit. In FIG. 9A, the valve sections $a_1$ to $d_1$ cooperate with each other to form a first valve group $V_1$. The valve sections $a_2$ to $d_2$ cooperate with each other to form a second valve group $V_2$. Likewise, the valve sections $e_3$ to $h_3$ constitute a third valve group $V_3$ and the valve sections $e_4$ to $h_4$ constitute a fourth valve group $V_4$.

Also, the third and fourth valve groups $V_3$ and $V_4$ in the control valve section $V_0$ are provided on an upstream side thereof with a variable throttle valve 24, which functions to permit the third and fourth valve groups $V_3$ and $V_4$ to communicate therethrough with the pump 15.

The variable throttle valve 24 is adapted to control its degree of opening depending upon the velocity or speed of a vehicle on which the power steering system is to be mounted. More specifically, it is kept fully closed when the speed of the vehicle is at a low level, and the degree of opening of the valve 24 is gradually increased with an increase in the speed of the vehicle.

Accordingly, when steering is carried out, a difference in amount of fluid flow obtained by subtracting the amount of fluid bypassed through the variable throttle valve 24 from the total amount of fluid discharged from the pump 15 corresponds to the amount of fluid fed to the valve groups $V_1$ and $V_2$.

When the handle (not shown) is kept at a neutral position, the rotary spool 7 and sleeve 8 keep such a relationship as shown in FIG. 8 with respect to each other. More particularly, the feed ports 16 and 17 and first association channels 10 and 11 are caused to be just opposite to each other and the bypass ports 22 and 23 and second association channels 12 and 13 are opposite each other. Thus, the neutral state shown in FIG. 8 causes all the ports provided on the side of the sleeve 8 to communicate with the return channel 9, to thereby maintain the power cylinder non-operative.

Then, when the rotary spool 7 is rotated in a direction indicated at an arrow, the above-described communication manner is changed over. Now, the changing-over of the communication will be described with reference to FIG. 9A.

When the rotary spool 7 is rotated in the direction of the arrow as described above; the valve sections $a_1$ and $d_1$ of the first valve group $V_1$ and the valve sections $a_2$ and $d_2$ of the second valve group $V_2$ are increased in the degree of opening, whereas the valve sections $b_1$ and $c_1$ of the first valve groups $V_1$ and the valve sections $b_2$ and $c_2$ of the second valve group $V_2$ are closed.

This causes pressure oil to be fed to the one pressure chamber of the power cylinder and working oil in the other pressure chamber to be returned to the suction side of the pump.

Also, this results in the valve sections $e_3$ and $h_3$ of the third valve group $V_3$ and the valve sections $e_4$ and $h_4$ of the fourth valve group $V_4$ being increased in degree of opening and the valve sections $g_3$ and $f_3$ of the third valve group $V_3$ and the valve sections $g_4$ and $f_4$ of the fourth valve group $V_4$ being decreased in the degree of opening.

Accordingly, working fluid flowing into the bypass ports 22 and 23 is returned through restrictions of the valve sections $f_3$, $f_4$, $g_3$ and $g_4$ of the third valve and fourth vale groups $V_3$ and $V_4$ to the suction side of the pump 15. At this time, when the travel speed of the vehicle is low, the variable throttle valve is kept fully closed, resulting in fluid discharged from the pump 15 being prevented from flowing through the bypass ports 22 and 23. In other words, when the vehicle is traveling at a low speed, all fluid discharged from the pump 15 is fed to the power cylinder, to thereby cause power assistance force to be increased to a maximum level.

An increase in travel speed of the vehicle causes the degree of opening of the variable throttle valve 24 to be increased, so that the amount of fluid flowing through the variable throttle valve 24 may be increased correspondingly. Working fluid which has passed through the variable throttle valve 24, as described above, is returned through the respective valve sections to the suction side of the pump 15, so that the amount of fluid fed to the power cylinder is decreased correspondingly.

Such a decrease in the amount of fluid fed to the power cylinder causes the power assistance force to be reduced correspondingly.

In the conventional power steering system described above, the variable throttle valve 24 is provided on the upstream side of the third and fourth valve groups $V_3$ and $V_4$, so that pressure does not substantially act on the third and fourth valve groups $V_3$ and $V_4$, when, for example, the vehicle is traveling at a low speed, resulting in the throttle valve 24 being kept fully closed. However, when the travel speed of the vehicle is thus low, pressure under which fluid is fed to the power cylinder is increased, so that pressure acting on the first and second valve groups $V_1$ and $V_2$ is highly increased. This causes a difference between pressure acting on the first and second valve groups $V_1$ and $V_2$ and that acting on the third and fourth valve groups $V_3$ and $V_4$ to be maximized when the vehicle is traveling at a low speed. Such an increase in pressure difference between the first and second valve groups and the third and fourth valve groups causes unbalanced load to act on the rotary spool and sleeve, so that the rotary spool and sleeve may be deformed into a shape such as an elliptic shape or the like. Such deformation of the rotary spool and sleeve into an elliptic or oval shape causes problems such as an increase in friction between the rotary spool and the sleeve, leakage of working oil leading to a failure in desired control and the like. Another prior art power steering system is also proposed, which is disclosed in, for example, U.S. Pat. No. 4,561,521 and U.S. Pat. No. 4,570,735. The power steering system of the prior art is generally constructed in such a manner as shown in FIG. 9B, wherein a control valve section $V_0$ includes two sets of valve sections $V_1$, $V_2$ and $V_3$, $V_4$ which are arranged in an axial direction of the control valve section $V_0$ rather than in a circumferential direction thereof. Unfortunately, the power steering system shown in FIG. 9B particularly causes a problem of unbalanced pressure. Accordingly, an object of the present invention is to provide a power steering system which is capable of effectively preventing a rotary spool and a sleeve from being deformed into an elliptic shape or the like in any circumstances.

SUMMARY OF THE INVENTION

The present invention relates to a power steering system comprising an input shaft; and a rotary valve operatively connected through the input shaft to a handle and including a rotary spool and a sleeve arranged around the rotary spool; the rotary spool and sleeve being rotated relative to each other depending upon turning of the handle, resulting in being changed over, so that a direction of actuation of a power cylinder and power assistance force are controlled depending upon changing-over of the rotary valve.

The power steering system of the present invention constructed as described above is characterized in that first and second valve groups are provided so as to be changed over depending upon relative rotation between the rotary spool and the sleeve to control the amount of fluid fed to the power cylinder; the first and second valve groups are arranged in a manner to be positioned on a circumference of the sleeve and opposite to each other on a diametric line defined in a section perpendicular to an axis of the sleeve; third and fourth valve groups are provided so as to control the amount of a part of fluid discharged from a pump to substantially control feed pressure of the fluid; the third and fourth valve groups are arranged in a manner to be positioned in the same circumference and opposite to each other on a line perpendicular to the diametric line on which the first and second valve groups are positioned; blocks are arranged between the first valve group and the second valve group and between the third valve group and the fourth valve group so as to interrupt communication between the respective valve groups; and a valuable throttle valve which is controlled depending upon the travel speed of a vehicle is arranged on a downstream side of the third and fourth valve groups.

In the present invention constructed as described above, the variable throttle valve which functions to control the amount of fluid distributed at both high and low travel speeds of a vehicle is provided on the downstream side of the third and fourth valve groups for pressure control in parallel with the first and second valve groups for controlling the amount and pressure of fluid fed to the power cylinder, to thereby permit pressure acting on the first and second valve groups and that acting on the third and fourth valve groups to be substantially equal to each other.

The power steering system of the present invention thus permits pressure acting on the first and second valve groups and that acting on the third and fourth valve groups to be substantially equal to each other, so that uniform pressure may be equally applied to the whole circumference of the rotary spool and sleeve. This effectively prevents the rotary spool and sleeve from being deformed into an elliptic shape and eliminates disadvantages due to such deformation of the rotary spool and sleeve.

BRIEF DESCRIPTION OF DRAWINGS

FIGS. 1 to 6 shows an embodiment of a power steering system according to the present invention, wherein FIG. 1 is a sectional view showing an essential part of the embodiment, FIGS. 2 to 4 each are a schematic sectional view showing the relationship between a rotary spool and a sleeve in the embodiment, FIG. 5 is a circuit diagram showing an equivalent circuit of the embodiment and FIG. 6 is a schematic sectional view similar to FIG. 2 but further showing valve sections incorporated in the embodiment; and FIGS. 7 to 10 show a conventional power steering system, wherein FIG. 7 is a sectional view showing an essential part of the conventional power steering system, FIG. 8 is a schematic sectional view showing the relationship between a rotary spool and a sleeve, FIGS. 9A and 9B each are a circuit diagram showing an equivalent circuit of the conventional system and FIG. 10 is a schematic sectional view similar to FIG. 8 but further showing valve sections incorporated in the conventional power steering system.

DETAILED DESCRIPTION OF THE PREFERRED EMBODIMENT

Figure 1:
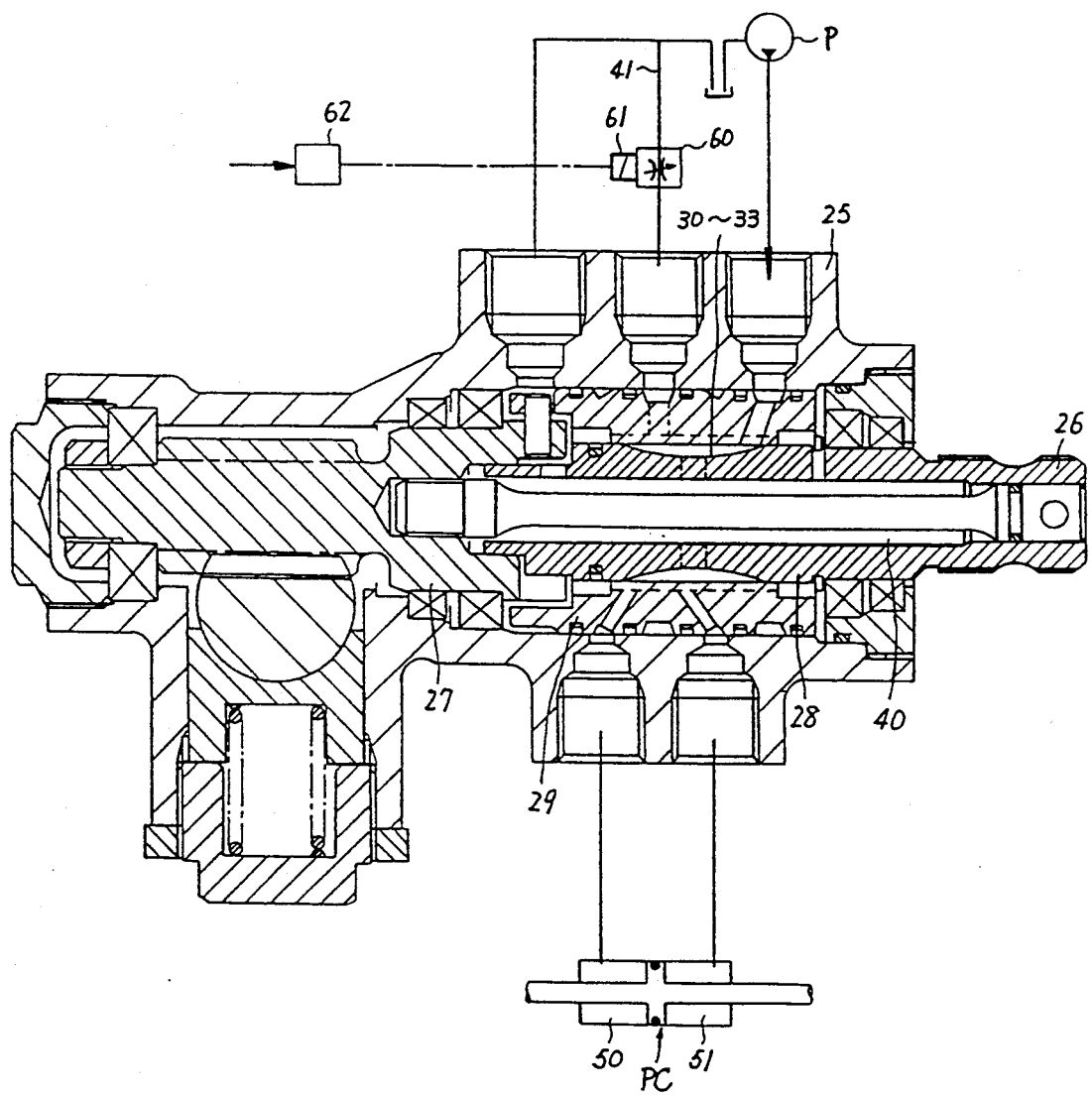

Now, the present invention will be detailedly described hereinafter in connection with an embodiment shown in the drawings.

Referring to FIGS. 1 to 6 showing an embodiment of a power steering system according to the present invention, a power steering system of the illustrated embodiment includes a casing 25 in which an input shaft 26 is inserted. Also, in casing 25 are arranged a pinion shaft 27, which is connected through a torsion bar to the input shaft 26. The input shaft 26 has a rotary spool 28 formed integral therewith, around which a sleeve 29 is fitted so that the rotary spool and sleeve 29 may be rotated relative to each other. The sleeve 29 is arranged so as to be rotated integral with the pinion shaft 27. For this purpose, the sleeve 29 is provided with a rack which is engaged with a pinion formed on the pinion shaft 27. Thus, it will be noted that the above-described construction of the illustrated embodiment is substantially the same as the prior art described above.

Figure 2:
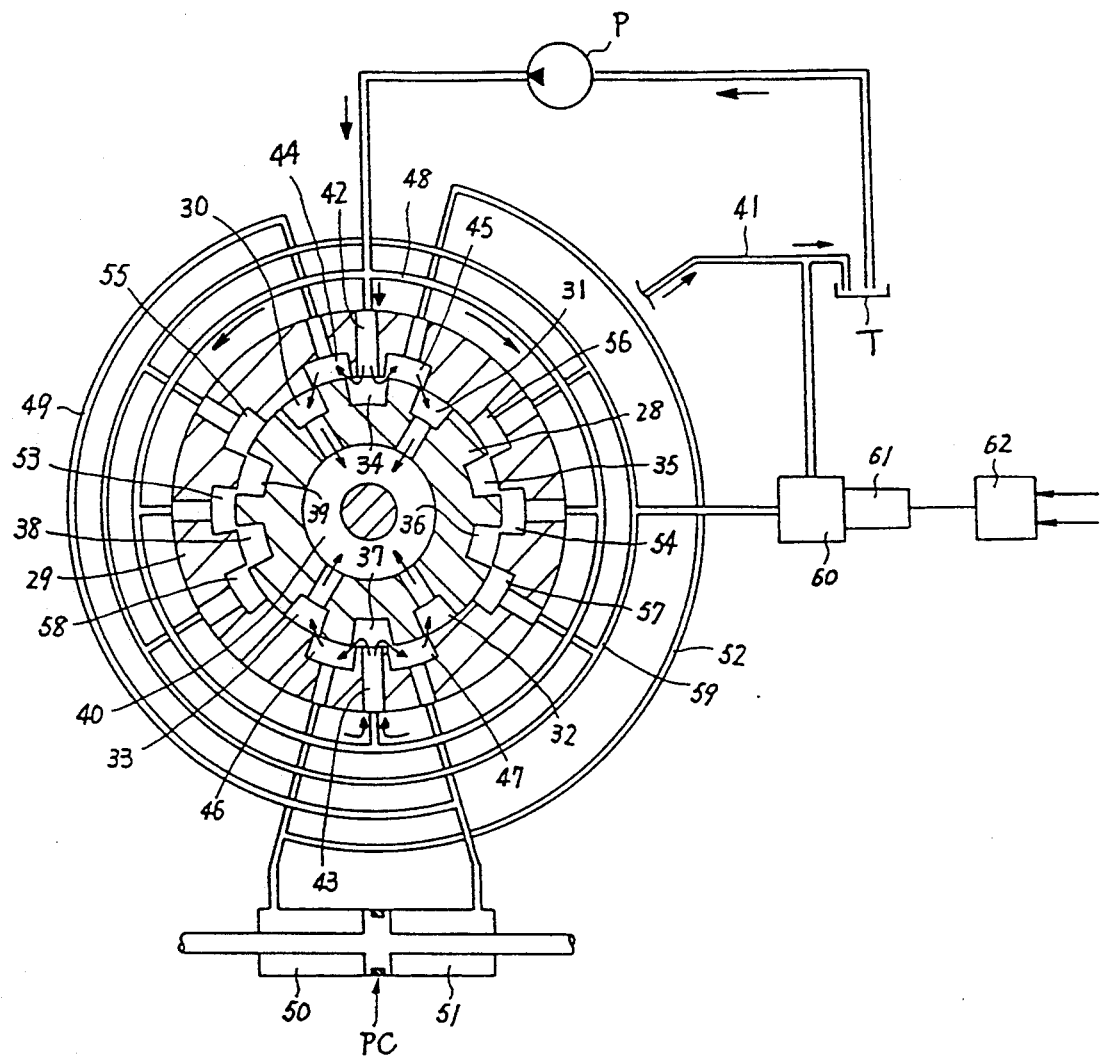
Figure 3:
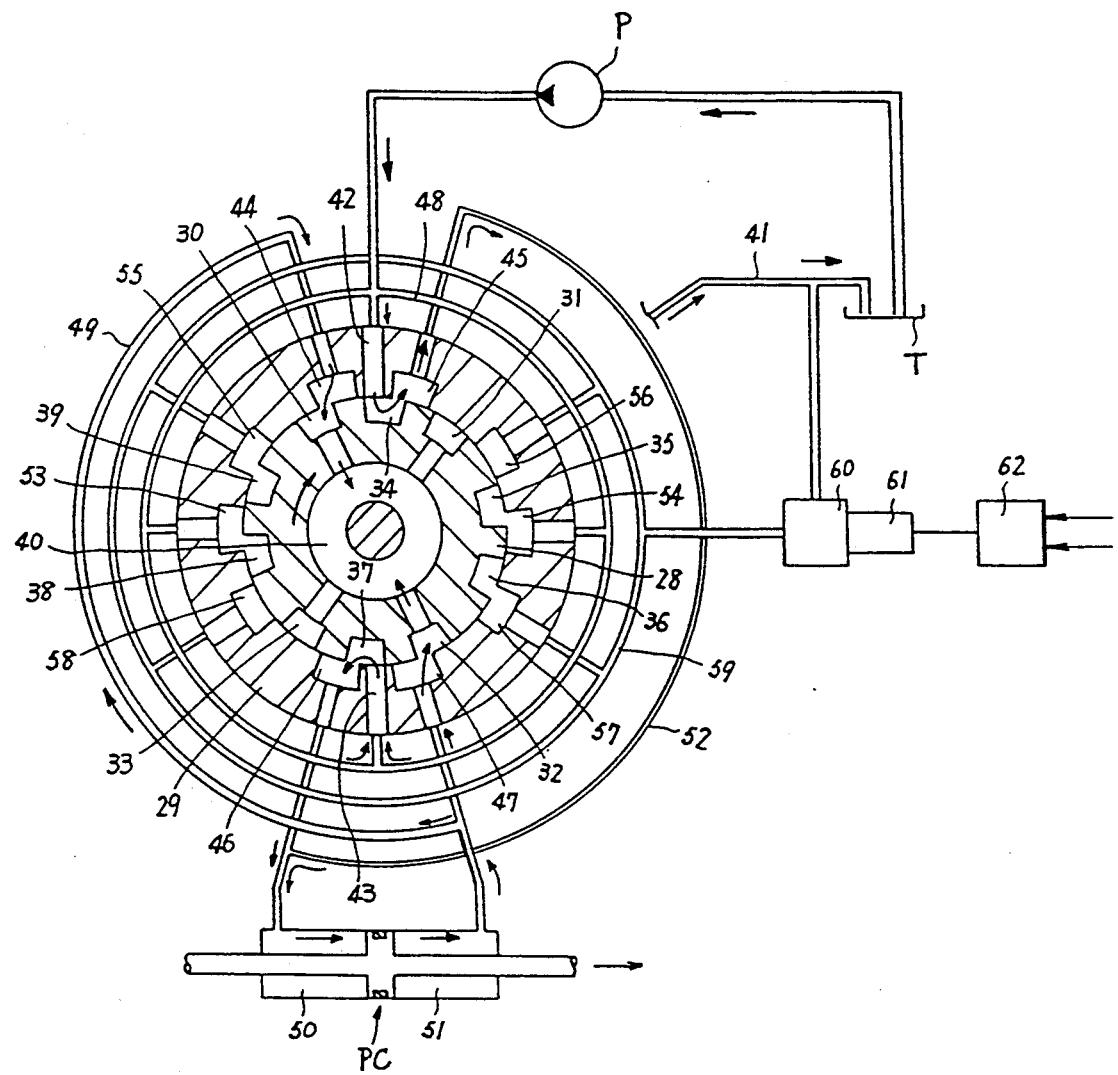
Figure 4:
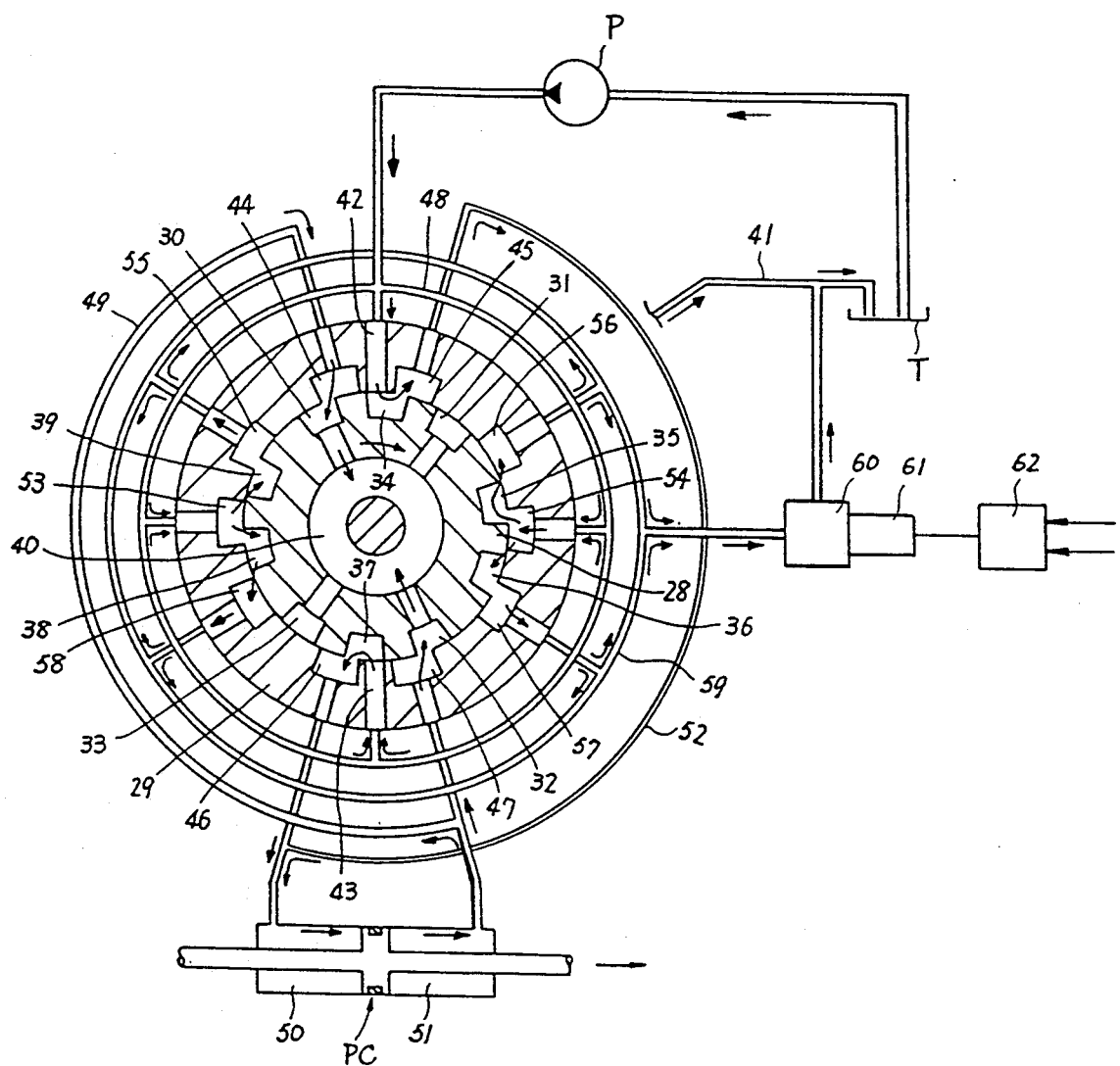

The rotary spool 28, as shown in FIGS. 2 to 4, is formed on a periphery thereof with four return channels 30 to 33 and six association channels 34 to 39. The return channels 30 to 33 are arranged so as to constantly communicate with a return hole 40 formed in the rotary spool 28. The return hole 40 is arranged so as to communicate with a return passage 41 connected to a reservoir tank T.

The sleeve 29 is formed with feed ports 42 and 43 in a manner to be positioned opposite to each other on a diametric line of the sleeve 29. Also, the sleeve 29 is formed with cylinder port channels 44, 45 and 46, 47 in a manner to be positioned on both sides of the feed ports 42 and 43, respectively.

The feed ports 42 and 43 are arranged so as to communicate through a first association passage 48 with each other. The first association passage 48 is provided so as to communicate with a pump P. The cylinder port channels 44 and 47 are arranged so as to communicate through a second association passage 49 with each other and further communicate with one of pressure chambers 50 and 51 of a power cylinder PC. In the illustrated embodiment, the channels 44 and 47 communicate with the right-side pressure chamber 51 of the power cylinder PC. The other cylinder port channels 45 and 46 are arranged so as to communicate through a third association passage 52 with each other and
pressure chamber 50 of the power cylinder PC.

The sleeve 29 is further formed with first relay channels 53 and 54 and second relay channels 55 to 58. The first relay channels 53 and 54 are arranged so as to communicate through the first association passage 48 with each other and communicate with the pump P. The second relay channels 55 to 58 are arranged so as to communicate through a fourth association passage 59 with one another. The fourth association passage 59 is adapted to communicate through a variable throttle valve 60 with the return passage 41. The variable throttle valve 60 includes a solenoid 61 and is constructed in such a manner that the solenoid 61 is electrically connected to a controller 62 to control the degree of opening of the variable control valve 60 depending upon a signal output from the controller 62. The controller 62 functions to control a current fed to the solenoid 61 depending upon the velocity or speed of a vehicle in such a manner that the variable throttle valve 60 is closed when the vehicle is traveling at a low speed and increased in degree of opening as the travel speed of the vehicle is increased. The feed port 42 and 43, the first relay channels 53 and 54, the second relay channels 55 and 57, and the second relay channels 56 and 58 are arranged in a circumferential direction of the sleeve 29 and positioned opposite to each other on a diametric line of the sleeve 29 perpendicular to an axis thereof, respectively. Also, the feed ports 42, 43 and the first relay channels 53, 54 are positioned in a manner to be deviated in phase from each other by an angle of about 90 degrees. The second relay channels 55, 58 and 56, 57 are positioned on both sides of the the first relay channels 53 and 54, respectively. An equivalent circuit of the so-constructed valve arrangement is shown in FIG. 5 and valve sections of the equivalent circuit are shown in FIG. 6 similar to FIG. 2.

Figure 5:
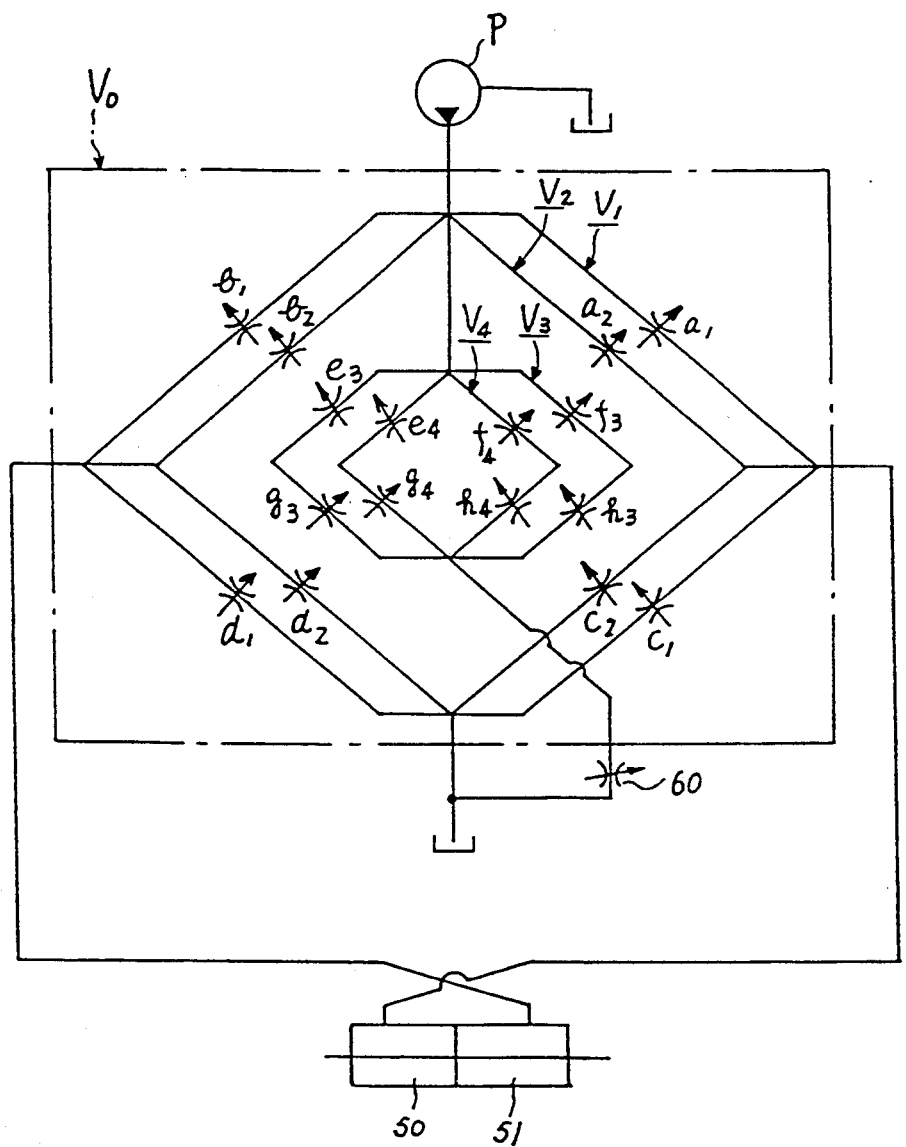
Figure 6:
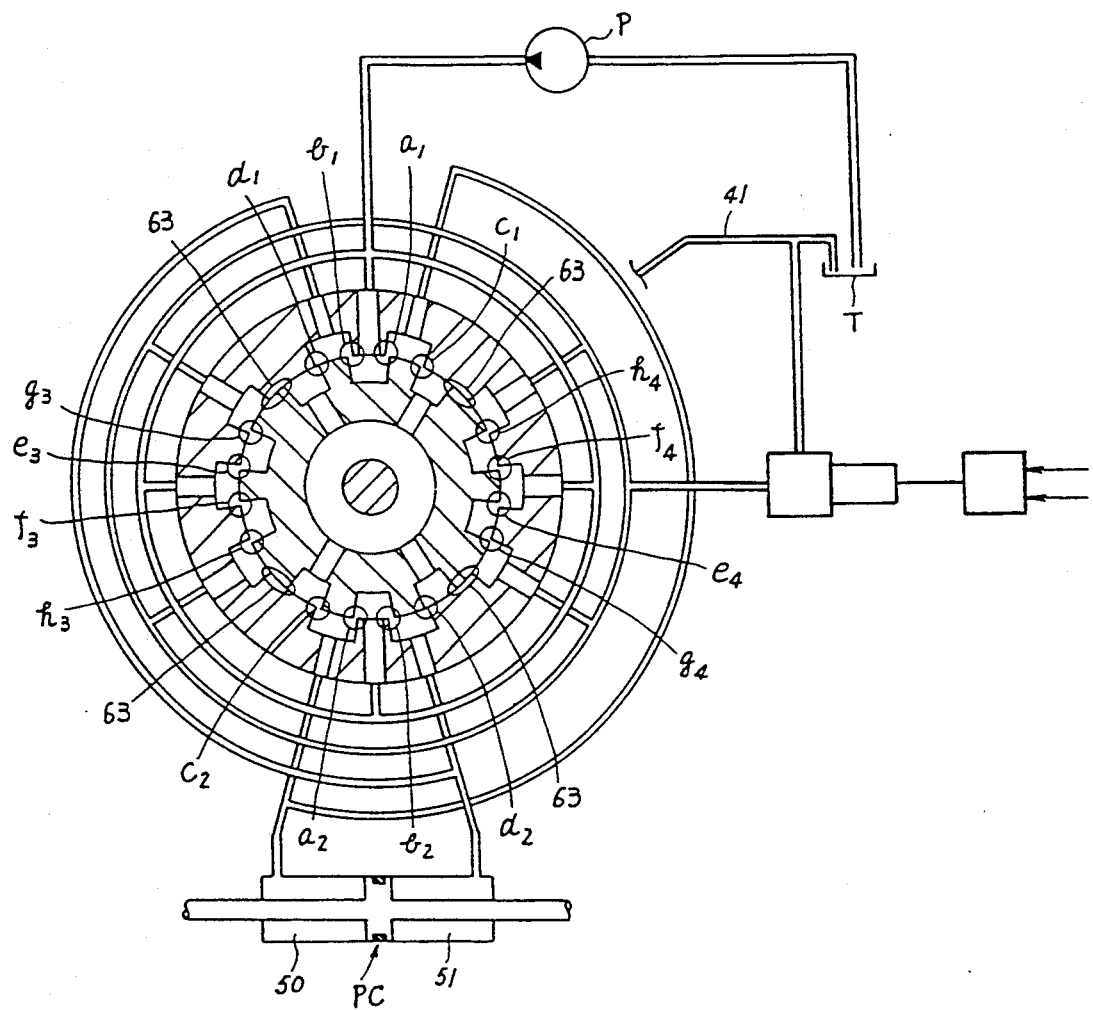
Figure 7:
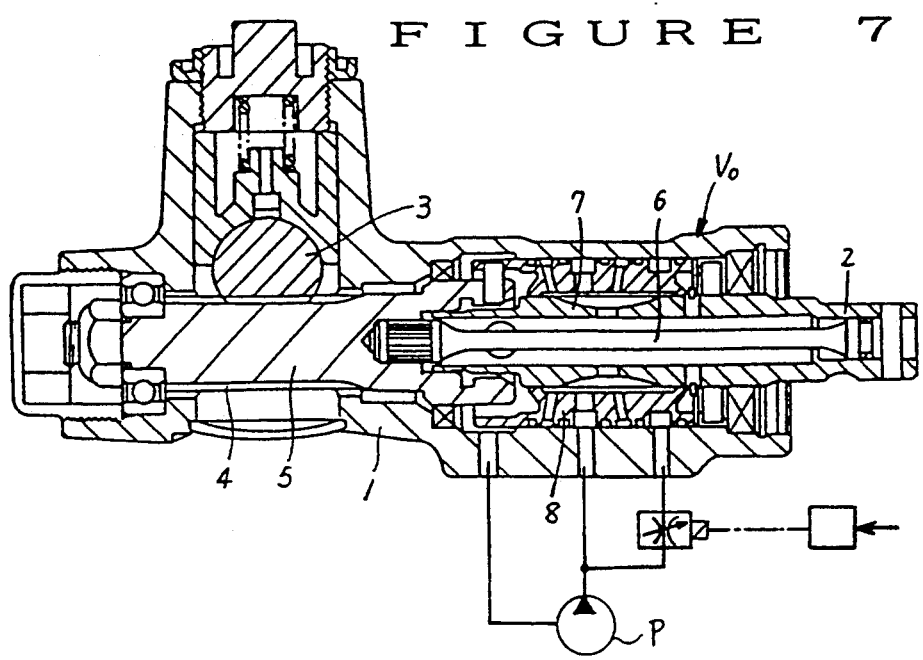
Figure 8:
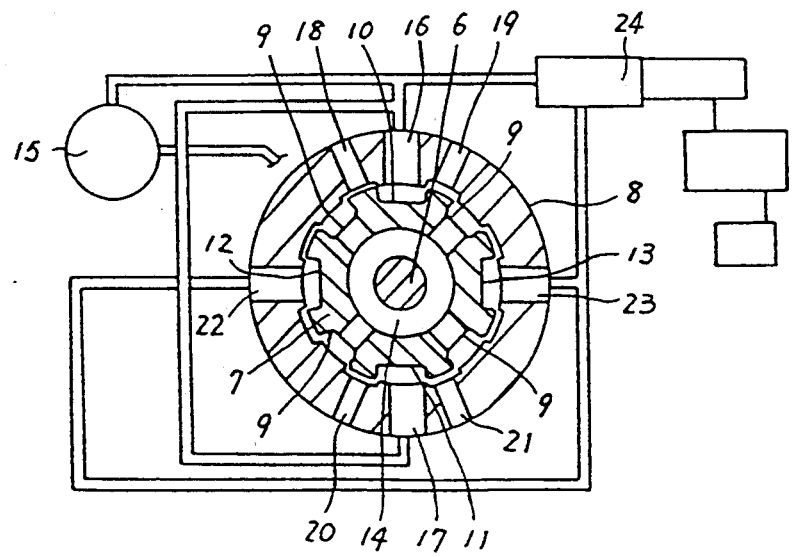
Figure 9:
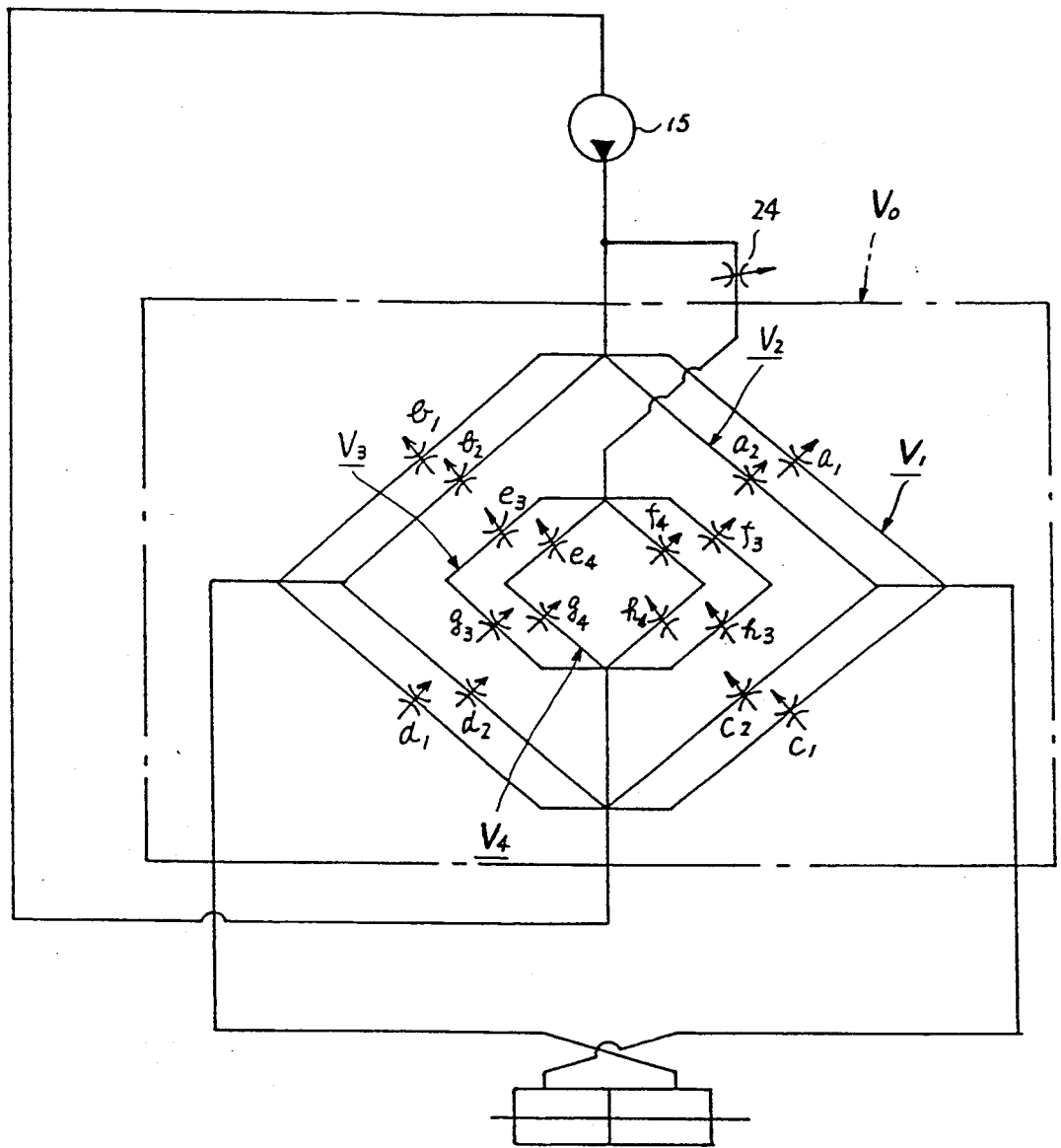

In FIG. 5, valve sections $a_1$ to $d_1$ cooperate with one another to form a first valve group $V_1$. Likewise, valve sections $a_2$ to $d_2$, valve sections $e_3$ to $h_3$ and valve sections $e_4$ to $h_4$ cooperate with one another to form a second valve group $V_2$, a third valve group $V_3$ and a fourth valve group $V_4$, respectively. Also, as shown in FIG. 6, block sections 63 are provided at boundaries between the first and second valve groups $V_1$, $V_2$ and the third and fourth valve groups $V_3$, $V_4$ to prevent the valve groups from communicating with one another. The variable throttle valve 60 is arranged on a downstream side of the third and fourth valve groups $V_3$ and $V_4$.

The above-described rotary spool 28 and sleeve 29 cooperate with each other to form a rotary valve for the present invention. When a handle (not shown) is at a neutral position, the rotary spool 28 and sleeve 29 are kept at such a relationship as shown in FIG. 2.

The neutral state shown in FIG. 2 causes the feed ports 42 and 43 formed at the sleeve to communicate through the association channels 34 and 37 with the cylinder port channels 44, 45 and 46, 47, respectively. Also, the cylinder port channels 44 to 47 are caused to communicate with the return channels 30 to 33, respectively. This results in all oil discharged from the pump P being returned from the return hole 40 formed at the rotary spool through the return passage 41 to the reservoir tank T, when the handle is kept at the neutral position.

At this time, the first and second relay channels 53 to 58 are caused to communicate through the association channels 35, 36, 38 and 39 formed at the rotary spool with one another.

Then, when the handle is turned right, the rotary spool is rotated in a direction indicated at an arrow in FIG. 3. FIG. 3 shows a vehicle that is traveling at a low speed, resulting in the variable throttle valve 60 being kept closed.

Subsequently, when the rotary spool 28 and sleeve 29 are rotated relative to each other as described above, the feed ports 42 and 43 are caused to communicate through the association channels 34 and 37 with the one cylinder port channels 45 and 46, respectively, and the other cylinder port channels 44 and 47 are caused to communicate with the return channels 30 and 32, respectively.

Therefore, oil discharged from the pump P is fed to the left-side pressure chamber 50 of the power cylinder PC and working oil in the right-side pressure chamber 51 is returned from the return hole 40 through the return passage 41 to the reservoir tank T.

Also, oil discharged from the pump P is led through the first association passage 48 to the first relay channels 53 and 54 as well. Pressure oil thus introduced to the first relay channels 53 and 54 is then fed through the association channels 35, 36, 38 and 39, a clearance between the rotary spool 28 and the sleeve 29, and the like to the second relay channels 55 to 58.

However, when the vehicle is traveling at a low speed, the variable throttle valve 60 is kept closed, so that even when the pressure oil is fed to the second relay channels 55 to 58 as described above, it is not returned to the return passage 41.

Thus, it will be noted that this causes all of the oil discharged from the pump P to be fed to the left-side pressure chamber 50 of the power cylinder PC. Concurrently, feed pressure acts on the first relay channels 53 and 54 and the second relay channels 53 to 58. The fact that feed pressure is applied to all the channels 53 to 58 indicates that pressure acts on the whole periphery of the rotary spool 28 uniformly or on an average. This effectively prevents the rotary spool 28 from being deformed into an elliptic shape or the like.

When the vehicle is traveling at a medium or high speed, the variable throttle valve 60 is caused to be open depending upon the travel speed of the vehicle, so that pressure oil led to the second relay channels 55 to 58 is returned through the fourth association 59, variable throttle valve 60 and return passage 41 to the reservoir tank T.

Even in this instance, feed pressure acts on the first first relay channels 53 and 54. The first relay channels 53 and 54, as described above, are arranged in a manner to be deviated in phase by about 90 degrees from the feed ports 42 and 43, so that feed pressure acts on the rotary spool 28 at every angular interval of 90 degrees. Accordingly, the rotary spool 28 is positively prevented from being deformed into an elliptic shape or the like even at this instance.

The above-described operation will be further described hereinafter with reference to FIG. 5.

When the rotary spool 28 is rotated in the direction indicated at the arrow as described above, the valve sections $a_1$ and $a_2$ and valve sections $d_1$ and $d_2$ of the first and second valve groups $V_1$ and $V_2$ are open, and the valve sections $b_1$ and $b_2$ and valve sections $c_1$ and $c_2$ are closed.

This results in pressure oil being fed to the one pressure chamber 50 of the power cylinder PC and working oil in the other pressure chamber 51 being returned to the reservoir tank T. Also, in the third and fourth valve groups $V_3$ and $V_4$, the valve sections $e_3$ and $e_4$ and valve sections $h_3$ and $h_4$ are decreased in degree of opening, whereas the valve sections $g_3$ and $g_4$ and valve sections $f_3$ and $f_4$ are increased in degree of opening. This causes working oil flowing into the third and fourth valve groups $V_3$ and $V_4$ to be returned to the reservoir tank T depending upon the degree of opening of the variable throttle valve 60. At this time, when the travel speed is low, the variable throttle valve 60 is kept fully closed, to thereby prevent oil discharged from the pump P from being returned through the variable throttle valve 60 to the reservoir tank T. This results in all oil discharged from the pump P being supplied to the power cylinder PC, to thereby permit power assistance force to be maximized.

As the travel speed is increased, the variable throttle valve 60 is increased in degree of opening correspondingly, so that the amount of oil flowing through the variable throttle valve 60 may be increased with an increase in the degree of opening. Working oil passing through the variable throttle valve 60 is returned to the reservoir tank T as described above, therefore, the amount of oil fed to the power cylinder PC is reduced correspondingly.

Such a decrease in amount of oil fed to the power cylinder PC as described above causes power assistance force to be reduced correspondingly.

Thus, the amount of oil returned to the reservoir tank T is adjusted depending upon the degree of opening of the variable throttle valve 60 and feed pressure under which fluid is fed to the power cylinder PC is finally controlled depending upon the degree of opening of the valve groups $V_1$, $V_2$, $V_3$ and $V_4$, so that pressure acting on the third and fourth valve groups located on the upstream side of the variable throttle valve 60 is rendered substantially equal to the pressure acting on the first and second valve groups and uniformly distributed. Thus, it will be noted that the rotary valve is effectively prevented from being free from any deformation.

The present invention is optimumly applied to a power steering system wherein an input shaft and a pinion shaft are connected through a torsion bar to each other and a rotary valve is changed over depending upon the amount of relative rotation between both shafts, so that a power cylinder is operated.

I claim:

1. A power steering system comprising an input shaft; a rotary valve operatively connected through said input shaft to a handle said including a rotary spool and a sleeve arranged around said rotary spool;

said rotary spool and sleeve being rotated relative to each other depending upon turning of the handle, resulting in being changed over, so that a direction of actuation of a power cylinder and power assistance force are controlled depending upon the changing-over of said rotary valve;

wherein first and second valve groups are provided so as to be changed over depending upon relative rotation between said rotary spool and said sleeve to control the amount of fluid fed to the power cylinder;

said first and second valve groups are arranged in a manner to be positioned on a circumference of said sleeve and opposite to each other on a diametric line defined in a section perpendicular to an axis of said sleeve;

third and fourth valve groups are provided so as to control the amount of a part of fluid discharged from a pump to substantially control feed pressure of the fluid;

said third and fourth valve groups are arranged in a manner to be positioned in the same circumference and opposite each other on a line perpendicular to said diametric line on which said first and second valve groups are positioned;

blocks are arranged between said first valve group and said second valve group and between said third valve group and said fourth valve group so as to interrupt communication between said respective valve groups; and a variable throttle valve which is controlled depending upon the travel speed of a vehicle arranged on a downstream side of said third and fourth valve groups.

* * * * *